No. 685,224. Patented Oct. 22, 1901.
A. H. SCHMIDT.
FEED WATER PURIFIER.
(Application filed Aug. 27, 1900.)
(No Model.) 2 Sheets—Sheet 1.
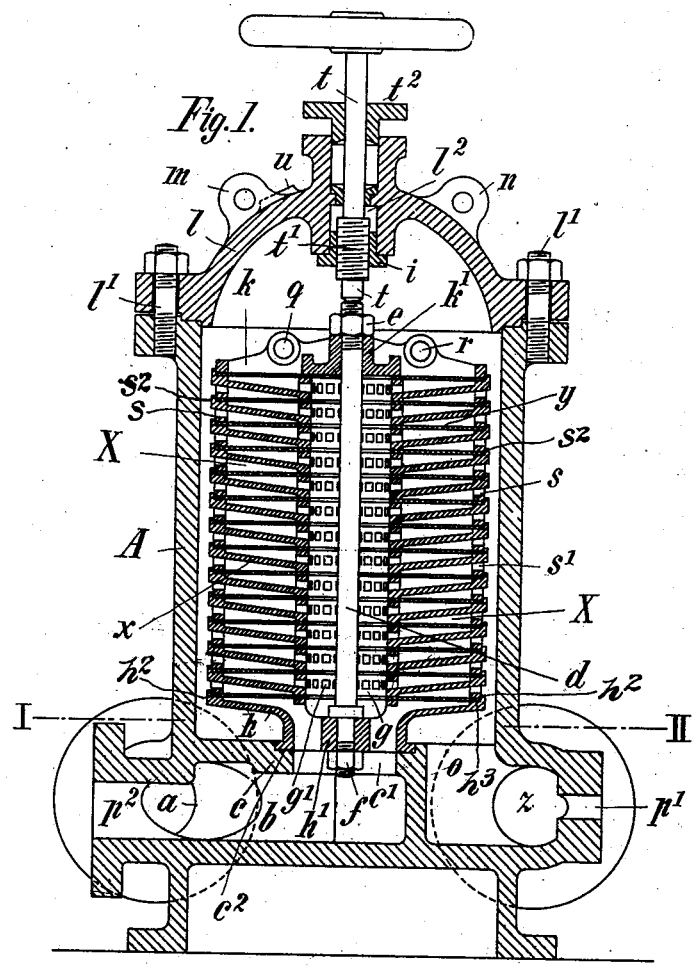
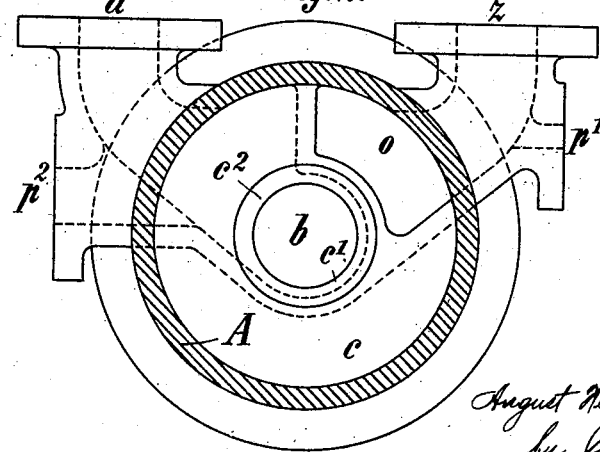

No. 685,224. Patented Oct. 22, 1901.
A. H. SCHMIDT.
FEED WATER PURIFIER.
(Application filed Aug. 27, 1900.)
(No Model.) 2 Sheets—Sheet 2.
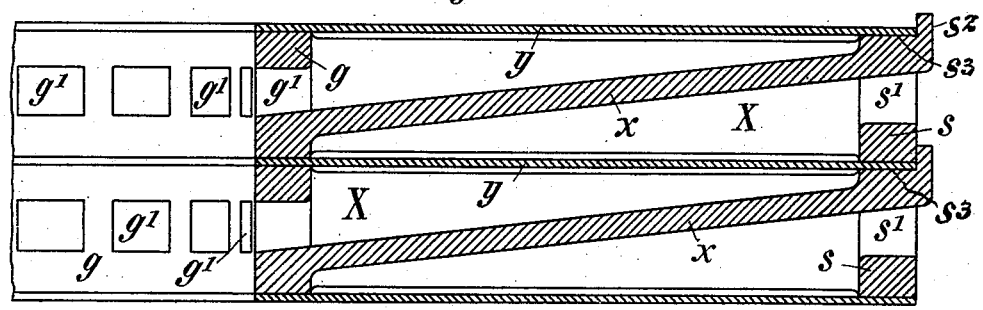
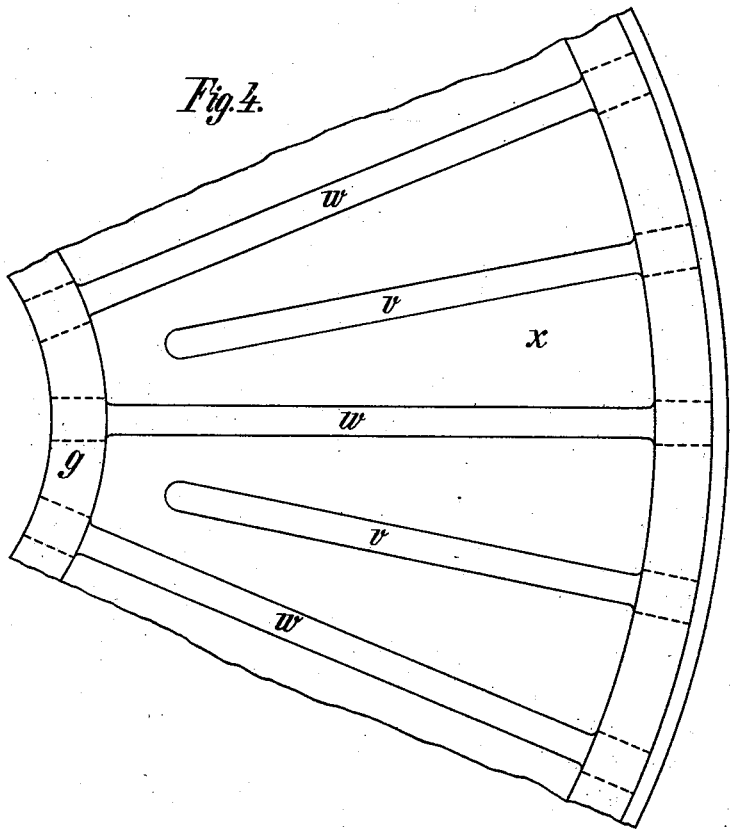

UNITED STATES PATENT OFFICE.

AUGUST HERMANN SCHMIDT, OF HAMBURG, GERMANY.

FEED-WATER PURIFIER.

SPECIFICATION forming part of Letters Patent No. 685,224, dated October 22, 1901.

Application filed August 27, 1900. Serial No. 28,212. (No model.)

*To all whom it may concern:*

Be it known that I, AUGUST HERMANN SCHMIDT, a subject of the German Emperor, and a resident of Hamburg, in the German Empire, have invented certain new and useful Improvements in Feed-Water Purifiers and Filters, of which the following is a specification.

This invention has relation to feed-water purifiers for use in connection with steam-generators; and it has for its object a construction of apparatus whereby an efficient purification of the feed-water can be effected and whereby the apparatus can be readily cleansed without injury to the purifying appliances. The first of these objects I attain by the use of a filter-body composed of a series of superposed spacing-plates, preferably dished plates, between each two of which I interpose a foraminous sheet or filtering medium, the arrangement being such as to form a receiving-chamber below and a delivery-chamber above each filtering medium and to so arrange the inlet or feed and outlet or delivery ports as to admit the feed-water to said receiving-chambers, cause it to flow through the filtering medium and from the delivery-chamber above the same. I am thus enabled to collect the impurities of greater specific gravity than water on the plates, while the impurities of less specific gravity than water will adhere more or less to the under face of the filtering media, thus relieving the same from the action thereon, either mechanical or chemical, of the heavier impurities.

The second object of my invention I attain by providing means whereby a cleansing fluid can be forced in a direction the reverse of that of the flow of the feed-water—namely, into the delivery-chambers, thence through the filtering media into the receiving-chambers, and finally out of the apparatus.

It will be obvious to any one skilled in the art to which this invention pertains that the cleansing of the purifier is the most effective possible and without injury to the filtering media, the lighter impurities adhering to the under side of said media being readily removed by the cleansing fluid passing therethrough, and owing to the inclination or dished form of the plates the heavier impurities or sludge are likewise readily carried away by the cleansing fluid—as steam, for instance; but that my invention may be fully understood I will describe the same in detail, reference being had to the accompanying drawings, in which—

Figure 1 is a vertical section of and illustrating a simple and practical form of feed-water purifier in accordance with my invention. Fig. 2 is a cross-section thereof, the filter-body being removed. Fig. 3 is a fragmentary cross-section of two dished plates and the filtering media therefor, and Fig. 4 is a fragmentary under side view of one of said plates.

A suitable casing A is provided with a feed-water-inlet branch $a$, a feed-water-outlet branch $z$, a cleansing-fluid-inlet branch $p'$, and a cleansing-fluid-outlet branch $p^2$. The feed-water-inlet branch $a$ and the cleansing-fluid-outlet branch $p^2$ are in communication with the casing A through a chamber $b$, having an opening $c'$ arranged axially of the said casing, while the feed-water-outlet branch $z$ and the cleansing-fluid-inlet branch $p'$ are in direct communication with such casing A. Around the upper or inner end of the opening $c'$ in the roof of chamber $b$ is formed a circular seat $c^2$ for the filter-body. This filter-body is composed of a circular head-plate $k$, having a central hub $k'$, of a foot-plate $h$, having a tubular axial hub seating in the aforementioned seat $c^2$, formed around opening $c'$, said foot-plate being dished and provided in its hub with an axially-disposed bridge $h'$, bored out to form a bearing for the tie-rod $d$, on which a number of filter elements X are threaded and are firmly tied together between the head and foot plates by means of nuts $e$ and $f$, respectively, bearing on hub $k'$ of head-plate $k$ and bridge $h'$ of foot-plate $h$, as clearly shown in Fig. 1.

For the purpose of holding the filter-body firmly to its seat $c'$ I employ a screw-spindle $t$, the screw-threaded portion $t'$ of which works in a nut $i$, screwed into a passage or bore $l^2$ in the cover $l$ for casing A, the stem of said spindle extending through a suitable stuffing-box $t^2$ outside of said cover and carrying a hand-wheel, the inner end of said spindle impinging upon tie-rod $d$. The cover $l$ is secured to casing A by means of bolts $l'$ and has an apertured boss $u$ for the reception of a venting-valve (not shown) and which may be of any suitable construction, and said cover is provided with perforated lugs or ears $m$ and $n$, so that it may be connected with a hoisting device and lifted off.

In order to admit of the removal of the filter-body from its casing, the head-plate $k$ is likewise provided with perforated lugs or ears $q$ and $r$, so that on removal of the cover with the tightening or seating spindle $t$ the said filter can be lifted out of casing A whenever this becomes necessary from any cause. The foot-plate $h$ is also provided with an upwardly-projecting encompassing flange $h^2$, with an inner circular flat seat $h^3$ at the foot of said flange, and with an annular axial seat.

The filter elements consist of preferably-dished discoidal plates $x$ and filtering media $y$, said plates having an interspacing-flange projecting downwardly and upwardly, respectively, as shown at $s$ $s^2$, Fig. 1, and more clearly in the enlarged fragmentary section, Fig. 3, an annular seat-face $s^3$ being formed at the foot of the inner face of the upwardly-projecting flange $s^2$. The outer face of the downwardly-projecting flange $s$ is on a line with the inner face of the upwardly-projecting flange $s^2$, and the cross-sectional area of said flange $s$ is equal to the cross-sectional area, or substantially so, of the seat-face $s^3$, so that said flange $s$ of one plate X will fit snugly into flange $s^2$ of the plate next below, and said seats $s^3$ serve to support a sheet $y$ of any suitable filtering material, as clearly shown in Fig. 3, a similar sheet being applied to the foot-plate $h$, so that when the filter elements are tied together and clamped between the head and foot plates by the tie-rod $d$ and nuts $e$ and $f$ the filtering media $y$ will also be firmly clamped in position. Each dished disk $x$ has a tubular axial hub $g$, the upper and lower faces of which are on a level with the seat-face $s^3$ and the under face of the circular flange $s$, respectively, and in said hub, which serves also as an axial support for the filtering media $y$, are formed ports $g'$, leading to the inclined or dished face of the disk $x$. On the other hand, in the downwardly-projecting rim-flange $s$ of each disk are formed outlet-ports $s'$.

It will be seen that with the construction described there is formed an axial passage extending from the tubular hub of the foot-plate $h$ to the head-plate $k$, the filtering media $y$ having a corresponding axial aperture, and there is also formed a receiving-chamber between each disk and filtering medium, said chambers being in communication with said axial passage through ports $g'$, while above each filtering medium is formed a delivery-chamber in communication with casing A through ports $s'$, a construction whereby the water is effectually purified and whereby the filter-body can be effectually cleansed.

The operation of the feed-water purifier is as follows: The pipes (not shown) leading to the steam-inlet $p'$ and the sludge-outlet $p^2$, which in practice are provided with suitable cut-off valves, are cut off from casing A, and water flowing through port $a$ into chamber $b$ will rise into the axial passages formed by hubs $g$ of the disks $x$ into the receiving-chambers through ports $g'$, through filtering media $y$, and through ports $s'$ into casing A, and thence through outlet-port $z$ to the boiler, the lighter impurities adhering more or less firmly to the under side of the filtering media, while the heavier impurities settle on the inclined faces of the disks $x$ in view of the fact that the flow of water is retarded by said filtering media. Should it become necessary to cleanse the purifier, the water supply and exhaust are cut off and the valves in the pipes leading to ports $p'$ $p^2$ opened, steam being admitted to casing A and flowing in a direction opposite to the direction of flow of the water passing from the said casing through the ports $s'$ into the delivery-chambers, thence through the filtering media into the receiving-chambers, from the latter through ports $g'$ into the axial passage formed by the hubs of disks or plates $x$, and from said axial passage to casing-chamber $b$ and sludge branch $p^2$. In this manner the filtering media $y$ are readily and effectually freed from the lighter impurities separated from the feed-water, while, owing to the inclination of the disks or plates $x$ to their axes, the heavier impurities are as readily and effectually swept off into the axial passage of the filter-body and thence to the sludge branch $p^2$.

Having thus described my invention, what I claim as new therein, and desire to secure by Letters Patent, is—

1. In combination, a casing, a filter-body therein comprising a series of superposed spaced filtering media, and a passage closed at one end and extending through said series of filtering media, the space below each medium in communication with said passage and the space above each of said media in communication with the casing, the latter provided with an inlet and with an outlet, and with a second inlet and a second outlet in communication with the open end of the aforesaid passage, for the purpose set forth.

2. In combination, a casing, a filter-body therein, comprising a series of superposed spaced discoidal filtering media, and an axial passage closed at one end and extending through said series of filtering media, the space below each medium in communication with said passage and the space above each of said media in communication with the casing, the latter provided with an inlet and outlet and with a second inlet and a second outlet both in communication with the open end of the aforesaid axial passage, for the purpose set forth.

3. In combination, a casing, a filter-body therein comprising a series of superposed dished disks having an axial tubular hub provided with ports, a filtering medium between each two disks, heads for said filter-body one of said heads provided with an axial opening in register with the passage formed by the axial hubs of the disks, the space between the dished face of a disk and the filtering medium thereon in communication with the aforesaid passage through the ports in the hubs, and the space between the upper face of a filtering medium and the under face of a disk in communication with the casing, the latter provided with an outlet and with an inlet connected with the aforesaid opening in one of the heads of the filter-body, for the purpose set forth.

4. In combination, a casing, a filter-body therein comprising a series of superposed dished disks having an axial tubular hub provided with ports, a filtering medium between each two disks, heads for said filter-body, one of said heads provided with an axial opening in register with the passage formed by the axial hubs of the disks, the space between the dished face of a disk and the filtering medium thereon in communication with the aforesaid passage through the ports in the hubs, and the space between the upper face of a filtering medium and the under face of a disk in communication with the casing, the latter provided with an outlet and with an inlet and with a second inlet and a second outlet both connected with the aforesaid axial opening in one of the heads of the filter-body, for the purpose set forth.

AUGUST HERMANN SCHMIDT.

Witnesses:
MAX ALTHAUSSE,
MAX LEMCKE.